(12) United States Patent
Ashikhmin (10) Patent No.: US 7,599,444 B2
(45) Date of Patent: Oct. 6, 2009

(54) CODING IN A MIMO COMMUNICATION SYSTEM

(75) Inventor: Alexei Ashikhmin, Morris County, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 665 days.

(21) Appl. No.: 11/317,140

(22) Filed: Dec. 23, 2005

(65) Prior Publication Data

US 2007/0053460 A1    Mar. 8, 2007

Related U.S. Application Data

(63) Continuation-in-part of application No. 11/219,126, filed on Sep. 2, 2005, now abandoned.

(51) Int. Cl.
H04B 7/02 (2006.01)
H04L 1/02 (2006.01)

(52) U.S. Cl. .................. 375/267; 375/299

(58) Field of Classification Search .......... 375/260, 375/267, 299
See application file for complete search history.

(56) References Cited

U.S. PATENT DOCUMENTS 7,139,328 B2 * 11/2006 Thomas et al. ............ 375/299
7,216,267 B2 * 5/2007 Santraine et al. .......... 714/709
2005/0185734 A1   8/2005 Hottinen et al. ........... 375/295

OTHER PUBLICATIONS

Ashikhmin, A., et al., "Space-Time Reed-Muller Codes for Noncoherent MIMO Transmission," International Symposium on Information Theory, 5 pages, Australia, Sep. 2, 2005.
PCT Search Report dated Dec. 8, 2006.
MacWilliams, F.J. et al., "The Theory of Error-Correcting Codes," North Holland Mathematical Library, vol. 16, Chapter 14, pp. 406-432, 1977 Elsevier Science B.V.
Hochwald, B.M. et al., "Unitary Space-Time Modulation for Multiple-Antenna Communications in Rayleigh Flat Fading," IEEE Transactions on Information Theory, vol. 46, No. 2, pp. 543-564, Mar. 2000.

* cited by examiner

Primary Examiner—David B Lugo
(74) Attorney, Agent, or Firm—John F. McCabe (57) ABSTRACT

A method of receiving information includes receiving a vector of signal values for a transmitted codeword in antennas of a MIMO receiver array in each of a sequence of time slots. Each vector forms one row of a matrix Y. Each antenna receives the signal values of one column of the matrix Y over the sequence of time slots such that one of the antennas receives the signal values of each column of the matrix Y. The method also includes evaluating a vector $S(0, \ldots, 0)$ for an associated zero m-component vector $(0, \ldots, 0)$. The vector $S(0, \ldots, 0)$ is given by a Hadamard transform of the diagonal part of the square matrix $Y \cdot Y^\dagger$.

20 Claims, 4 Drawing Sheets

CODING IN A MIMO COMMUNICATION SYSTEM

This is a continuation-in-part application of application Ser. No. 11/219,126, filed Sep. 2, 2005 now abandoned.

BACKGROUND

1. Field of the Invention

The invention relates to multiple-input-multiple-output (MIMO) communication systems and methods of operating MIMO systems.

2. Discussion of the Related Art

A MIMO communication system includes a transmitter with multiple transmitting antennas, a receiver with multiple receiving antennas, and a free space channel coupling the transmitting and receiving antennas. The transmitting antennas transmit on the same frequency band in each time slot. For that reason, a transmitter having M transmitting antennas can be viewed as sending a row of M signal values in each time slot. If the transmitter transmits a message over T time slots, the message is associated with a T×M dimensional matrix, U, of signal values.

The free space channel couples the multiple transmitting antennas to various ones of the receiving antennas. Thus, in each time slot, individual receiving antennas receive a signal combining transmitted signals from more than one of the transmitting antennas. A transmission matrix, H, whose elements are the complex channel attenuations between various pairs of transmitting and receiving antennas, defines these combinations. In T time slots, N receiving antennas will receive a message that is described by a T×N dimensional matrix Y. The matrix Y approximately satisfies Y=U·G·H+w where w is an additive noise matrix and G is a diagonal matrix of transmission gains.

Thus, knowledge of the transmission matrix, H, can enable the MIMO receiver to disentangle the signals transmitted by different ones of the transmitting antennas, e.g., if H is invertible. For that reason, it is sometimes desirable to measure the transmission matrix, H. One method of measuring H, involves transmitting standard pilot beams from various ones of the transmitting antennas and measuring the signals received in response to the transmission of the standard pilot beams. Unfortunately, the use of pilot beams is not convenient in all MIMO communication systems. For example, the uses of such pilot beams may not be enable measurements of the transmission matrix, H, for a channel whose properties are changing rapidly. In such MIMO communication systems, decoding is performed without a detailed knowledge of the transmission matrix.

BRIEF SUMMARY

Various embodiments provide for apparatus and method for operating portions of MIMO communication systems with advantageous codebooks.

In one aspect, an apparatus is able to transmit a sequence of messages via a MIMO channel. The apparatus includes a MIMO transmitter. The MIMO transmitter has an array of antennas, is capable of selecting any codeword of a codebook, and is configured to select one of the codewords in response to receiving each message of the sequence. Each codeword of the codebook is a matrix. For each one of the selected codewords, the transmitter is configured to transmit signals from the antennas in a series of time slots corresponding to the one of the selected codewords such that the array transmits one column of the one of the selected codewords from each antenna and such that one row of the one of the selected codewords is transmitted in each of the time slots of the corresponding series. The transmitter is configured such that each of the codewords of the codebook is equal to a matrix $U(\lambda|a_1, \ldots, a_m|b_1, \ldots, b_m)$ and is such that $U(\lambda|a_1, \ldots, a_m|b_1, \ldots, b_m) \cdot U(\lambda|a_1, \ldots, a_m|b_1, \ldots, b_m)^\dagger$ is a projection operator $P(\lambda|a_1, \ldots, a_m|b_1, \ldots, b_m) \cdot P(\lambda|a_1, \ldots, a_m|b_1, \ldots, b_m)$, $b_m$) is a unitary transformation of $\frac{1}{2}[I+\lambda E(a_1, \ldots, a_m|b_1, \ldots, b_m)]$. Here, each of the $(a_1, \ldots, a_m|b_1, \ldots, b_m)$'s is a nonzero vector whose components are zero or one, and each of the $E(a_1, \ldots, a_m|b_1, \ldots, b_m)$'s is a direct product of m $e_j$'s, wherein each $e_j$ satisfies:

$$e_j = \begin{cases} I & \text{for } a_j = 0, b_j = 0 \\ \sigma^x & \text{for } a_j = 1, b_j = 0 \\ \sigma^y & \text{for } a_j = 1, b_j = 1 \\ \sigma^z & \text{for } a_j = 0, b_j = 1 \end{cases}.$$

In another aspect, a method provides for transmitting a sequence of messages from a MIMO array of antennas. The method includes selecting a codeword from a preselected codebook for each message of the sequence. Each codeword of the codebook is a matrix. For each one of the selected codewords, the method includes transmitting signals from the MIMO array of antennas in a series of time slots corresponding to the one of the selected codewords such that the MIMO array transmits one column of the one of the selected codewords from each antenna and such that one row of the one of the selected codewords is transmitted in each of the time slots of the corresponding series. Each of the codewords of the codebook is given by a matrix $U(\lambda|a_1, \ldots, a_m|b_1, \ldots, b_m)$ left multiplied by a unitary matrix and right multiplied by a unitary matrix. The columns of each of the $U(\lambda|a_1, \ldots, a_m|b_1, \ldots, b_m)$'s are given by $u_{j_1} \otimes \ldots \otimes u_{j_m}$'s, wherein each $u_{j_k}$ satisfies $$u_{j_k} = \begin{cases} v_{j_k}^I & \text{for } a_k = 0, b_k = 0 \\ v_{j_k}^x & \text{for } a_k = 1, b_k = 0 \\ v_{j_k}^y & \text{for } a_k = 1, b_k = 1 \\ v_{j_k}^z & \text{for } a_k = 0, b_k = 1 \end{cases}$$

and wherein $$v_0^I = \begin{bmatrix} 1 \\ 0 \end{bmatrix}, \quad v_1^I = \begin{bmatrix} 0 \\ 1 \end{bmatrix}, \quad v_0^x = \begin{bmatrix} 1 \\ 1 \end{bmatrix}, \quad v_1^x = \begin{bmatrix} 1 \\ -1 \end{bmatrix},$$

$$v_0^y = \begin{bmatrix} 1 \\ -i \end{bmatrix}, \quad v_1^y = \begin{bmatrix} 1 \\ i \end{bmatrix}, \quad v_0^z = \begin{bmatrix} 1 \\ 0 \end{bmatrix}, \quad v_1^z = \begin{bmatrix} 0 \\ 1 \end{bmatrix}.$$

In another aspect, a method of receiving information includes receiving a vector of signal values for a transmitted codeword in antennas of a MIMO receiver array in each of a sequence of time slots. Each vector forms one row of a matrix Y. Each antenna receives the signal values of one column of the matrix Y over the sequence of time slots such that one of the antennas receives the signal values of each column of the matrix Y. The method also includes evaluating a vector $S(0, \ldots, 0)$ for an associated zero m-component vector $(0, \ldots, 0)$. The vector $S(0, \ldots, 0)$ is given by a Hadamard transform of the diagonal part of the square matrix $Y \cdot Y^\dagger$.

In another aspect, an apparatus includes a MIMO receiver. The MIMO receiver includes an array of antennas. The receiver is configured to receive a vector of signal values for a transmitted codeword via the antennas in each of a sequence of time slots. Each vector forms one row of a matrix Y. The receiver is such that each antenna receives the signal values of one column of the matrix Y over the sequence of time slots such that the signal values of each column of the matrix Y are received in one of the antennas of the array. The receiver is configured to evaluate a vector $S(0, \ldots, 0)$ for a zero m-component vector $(0, \ldots, 0)$ from the received signal values. The vector $S(0, \ldots, 0)$ is given by a Hadamard transform of the diagonal part of the square matrix $Y \cdot Y^\dagger$.

BRIEF DESCRIPTION OF THE DRAWINGS

Various embodiments are described in the Figures and Detailed Description of Illustrative Embodiments. Nevertheless, the invention may be embodied in various forms and is not limited to the embodiments described in the Figures and Detailed Description of Illustrative Embodiments.

In the Figures and text, like reference numerals indicate elements with similar functions.

DETAILED DESCRIPTION OF ILLUSTRATIVE EMBODIMENTS

1. MIMO Communication System

Figure 1:
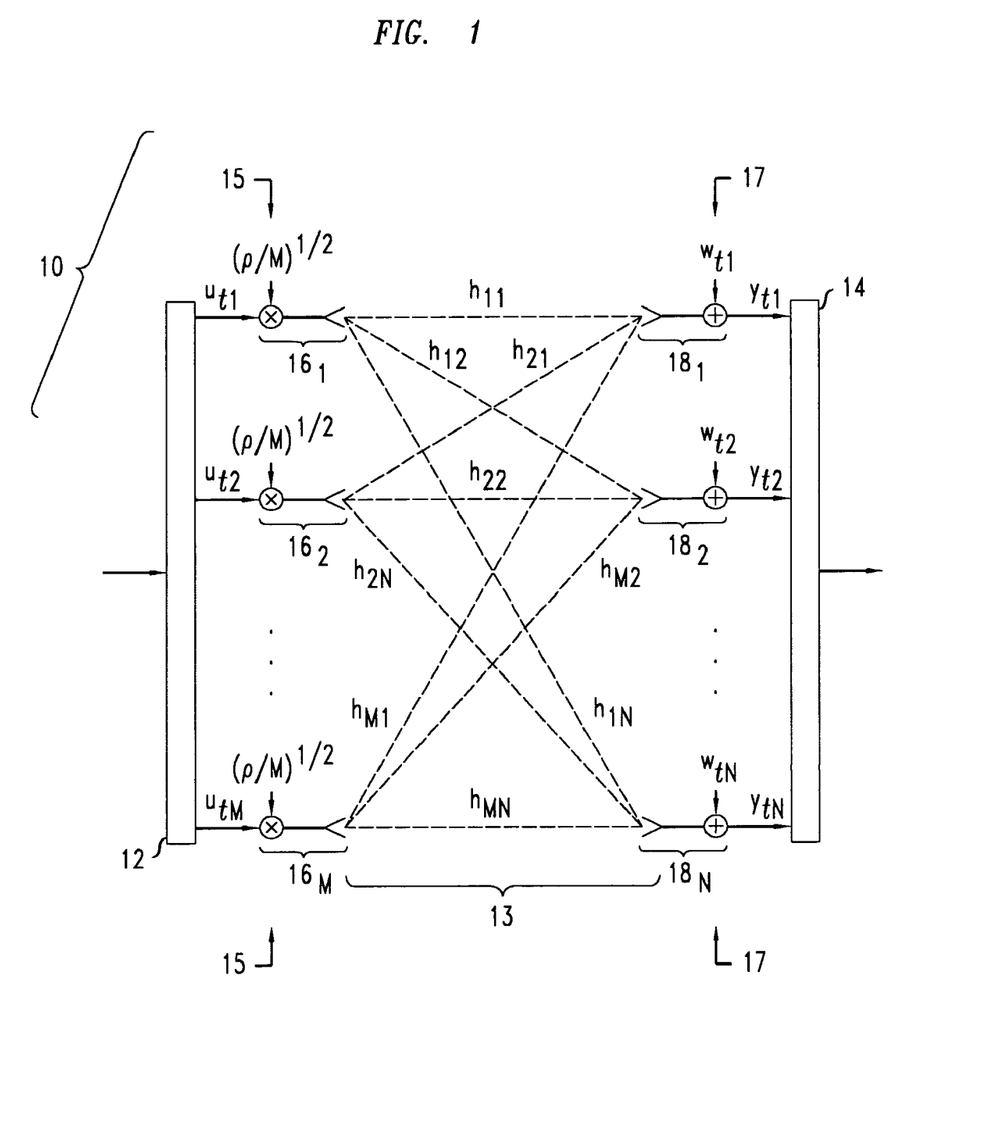
FIG. 1 is a schematic view of a multiple-input-multiple-output (MIMO) communication system.

FIG. 1 illustrates a multiple-input-multiple-output (MIMO) communication system 10. The system includes a transmitter 12, a communication channel 13, and a receiver 14. The transmitter 12 has an array 15 of M transmission antennas $16_1, \ldots, 16_M$. The channel 13 is, e.g., typically a free-space channel with a number of signal-scatterers therein (not shown). The receiver 14 has an array 17 of reception antennas $18_1, \ldots, 18_N$. The transmission and reception arrays 15, 17 may have the same or different numbers of antennas. That is, the positive integers "M" and "N" may be equal to or different. The number M is greater than 1 for a MIMO transmitter and is, e.g., preferably equal to $2^{m-1}$ where "m" is a positive integer greater than 1, e.g., m=2, 3, 4, 5, 6, 7, 8, 9, 10, or more.

The characteristics of the MIMO communication system 10 include transmission gains, a T×N-dimensional noise matrix w, and an M×N transmission matrix H. The transmission gains are ratios of the amplitudes of output signals over input signals at the transmission antennas $16_1, \ldots, 16_M$. In the exemplary array 15, each transmission gain is equal to $(\rho/M)^{1/2}$. In other embodiments, one or more of the transmission antennas $16_1, \ldots, 16_M$ may have different transmission gains. The noise matrix w describes additive noise at the array 17. In particular, component "$w_{tj}$" of the noise matrix w is the additive noise at associated reception antenna $18_j$ at communication time slot "t". The transmission matrix, H, describes the channel attenuation, i.e., including amplitude and phase, between the transmission and reception arrays 15, 17. In particular, the (j, k) component, $H_{jk}$, describes the coupling between the transmission antenna $16_j$ and the reception antenna $18_k$.

2. MIMO Communications

Figure 2:
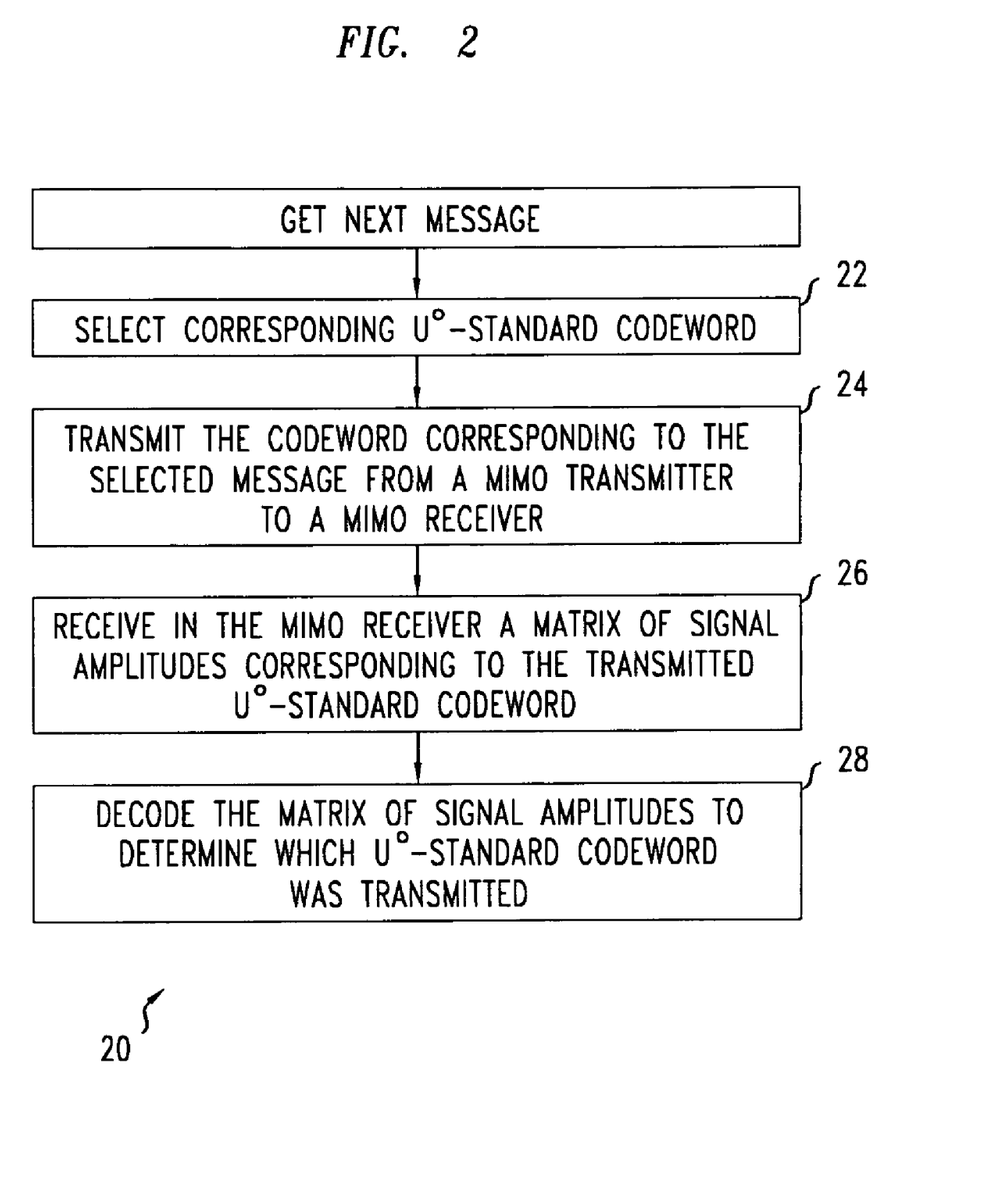
FIG. 2 is a flowchart illustrating an exemplary method of communicating using the MIMO communication system of FIG. 1.

FIG. 2 illustrates a method 20 of operating the MIMO communication system 10 of FIG. 1. The MIMO communication system 10 is able to send L types of messages from the transmitter 12 to the receiver 14. In particular, each message corresponds to one codeword in a preselected codebook having L codewords. Each codeword is a T×M matrix with a vector identifier "d" that uniquely identifies a single codeword.

The method 20 includes selecting a codeword to transmit, wherein the selected codeword corresponds to the next message "d" awaiting transmission to the MIMO receiver 14 (step 22). The set of available codewords forms a $U^O$-standard codebook. A $U^O$-standard codebook has L different codewords where the number L is less than or equal to $2^{2m+1} - 2$ as described below.

The method 20 includes transmitting the $U^O$-standard codeword that corresponds to the message "d" from the MIMO transmitter 12 to the MIMO receiver 14 (step 24). The transmitter 12 transmits the codeword, in a row-by-row manner over a sequence of T time slots, e.g., consecutive slots of equal length. In a time slot "t" of the sequence, the transmitter 12 transmits row "t" of the particular T×M matrix codeword, $U^O_d$, that corresponds to the selected message. In each time slot, the antennae $16_1, \ldots, 16_M$ of the transmitter 12 simultaneously transmit signals on the same frequency band. For example, antenna $16_k$ of the transmitter 12 transmits a corresponding signal of amplitude $(\rho/M)^{1/2} u_{tk}$ in a time slot "t". Over the T time slots for transmitting the selected codeword $U^O_d$, the antenna $16_k$ of the transmitter 12 transmits a corresponding column of the selected codeword $U^O_d$. In particular, the k-th antenna $16_k$ transmits the k-th column of the selected codeword $U^O_d$ during the T time slots corresponding to the message "d".

During T time slots, the method 20 includes receiving in the reception antennas $18_1, \ldots, 18_N$ signal amplitudes that together correspond to the transmitted codeword, $U^O_d$ (step 26). During the T transmission time slots for the message "d", the reception antennas $18_1, \ldots, 18_N$ together receive a T×N dimensional matrix Y of signal amplitudes. In particular, one row of Y is received in each of the time slots for the message "d". Over the whole set of time slots for the message "d", the j-th reception antenna $18_j$ receives the j-th column of the matrix Y. The received matrix Y can be modelized by $Y = (\rho/M)^{1/2} U^O_d \cdot H + w$. Here, w is an additive noise matrix, e.g., channel and electronics noise.

The method 20 includes decoding the matrix Y of signal amplitudes received by the reception antennae $18_1, \ldots, 18_N$ during the T signaling periods to determine which the identity of the transmitted codeword and thus, to determine the identity of the message transmitted (step 28). The decoding determines the identifier "d" of the transmitted $U^O$-standard codeword. In particular, the receiver 14 decodes the matrix Y based on its knowledge of the $U^O$-standard codebook to determine "d".

In some exemplary embodiments, the receiver 14 performs a decoding algorithm that provides a maximum likelihood determination of the identity of the transmitted codeword $U^O_d$. To perform such an algorithm, the receiver 14 evaluates the value of an inner product $\text{Tr}[U^O_k \cdot U^{O\dagger}_k \cdot Y \cdot Y^\dagger]$ for each codeword, $U^O_k$, of the selected $U^O$-standard codebook. Herein, Tr[A] refers to a trace of a matrix A. In such embodiments, the receiver 14 identifies the codeword that produced the largest inner product as being the transmitted codeword $U^O_d$. Indeed, $Tr[U^O_k \cdot U^{O\dagger}_k \cdot U^O_p \cdot U^{\dagger}_p]$ is significantly smaller when $k \neq d$ than when $k=d$ for codewords of a $U^O$-standard codebook. For example, the inner product may be about 50% smaller when $k \neq d$ than when $k=d$. Thus, if the channel 13 does not cause much distortion, the above inner product provides a good indicator of the identity of the transmitted codeword.

Furthermore, the maximum likelihood-decoding algorithm does not require knowledge of the channel's transmission matrix, H. For that reason, this algorithm may be advantageous in embodiments where measuring H is inconvenient. For example, such situations occur when channel properties change too fast to conveniently measure H by using pilot beams. Nevertheless, it is preferable that channel properties are substantially constant over the T time slots used to transmit a codeword even if the channel properties vary too fast to conveniently measure the transmission matrix H.

The method 20 includes performing steps 22, 24, 26, and 28 for each message to be transmitted. Thus, the method 20 allows communication of a sequence of selected messages between the transmitter 12 and receiver 14 of the MIMO communication system 10.

To perform the MIMO communication method 20, both the transmitter 12 and receiver 14 of FIG. 1 need to know the identity of the $U^O$-standard codebook that is used for coding messages. Different embodiments may use different $U^O$-standard codebooks. The forms and construction of such codebooks are described below.

3. Constructions of $U^O$-Standard Codebooks

A $U^O$-standard codebook is a set of codewords, $\{U^O_1, U^O_2, \ldots, U^O_L\}$, wherein each codeword $U^O_k$ is a $T \times 2^{m-1}$ matrix and T is $\leq 2^m$. Each $U^O$-standard codeword is uniquely identified by a corresponding 2m+1 dimension identifying vector. The identifying vectors have the form $(\lambda|a_1, \ldots, a_m|b_1, \ldots, b_m)$ where $\lambda \in \{+1, -1\}$, $a_j \in \{1, 0\}$, and $b_j \in \{1, 0\}$. There is no identifying vector in which $a_1 = \ldots a_m = b_1 = \ldots = b_m = 0$. Thus, the total number, L, of codewords in a given $U^O$-standard codebook is less than or equal to $2^{2m+1}-2$. Here, $2^{m-1}$ is also the number, M, of antennas $16_1, \ldots, 16_M$ in the MIMO transmitter 12 of FIG. 1.

Each $U^O$-standard codebook is constructed from a U-standard codebook whose codewords are $T \times 2^{m-1}$ matrices, which are referred to as $U(\lambda|a_1, \ldots, a_m|b_1, \ldots, b_m)$'s. In this notation, the vector subscript is the codeword's identifying vector. Each codeword $U(\lambda|a_1, \ldots, a_m|b_1, \ldots, b_m)$ is constructed from $2^m$-dimension column vectors that will be referred to as $u_{(j_1, \ldots, j_m)}$'s. Each $u_{(j_1, \ldots, j_m)}$ is a direct product of the form $u_{j_1} \otimes \ldots \otimes u_{j_m}$ where each $u_{j_k}$ is a 2-dimension column vector whose form depends on the $a_k$ and $b_k$ components of the associated U-standard codeword's identifying vector. In particular, the $u_{j_k}$'s are defined as follows:

$$u_{j_k} = \begin{cases} v^I_{j_k} & \text{for } a_k = 0, b_k = 0 \\ v^x_{j_k} & \text{for } a_k = 1, b_k = 0 \\ v^y_{j_k} & \text{for } a_k = 1, b_k = 1 \\ v^z_{j_k} & \text{for } a_k = 0, b_k = 1 \end{cases} \text{ where}$$

-continued $$v^I_0 = \begin{bmatrix} 1 \\ 0 \end{bmatrix}, \quad v^I_1 = \begin{bmatrix} 0 \\ 1 \end{bmatrix}, \quad v^x_0 = \begin{bmatrix} 1 \\ 1 \end{bmatrix}, \quad v^x_1 = \begin{bmatrix} 1 \\ -1 \end{bmatrix},$$

$$v^y_0 = \begin{bmatrix} 1 \\ -i \end{bmatrix}, \quad v^y_1 = \begin{bmatrix} 1 \\ i \end{bmatrix}, \quad v^z_0 = \begin{bmatrix} 1 \\ 0 \end{bmatrix}, \quad v^z_1 = \begin{bmatrix} 0 \\ 1 \end{bmatrix}.$$

Each $u_{(j_1, \ldots, j_m)}$ also has an index "P" defined by: $P = [j_1 + \ldots + j_m] \mod 2$. Based on these definitions, the U-standard codewords are defined as: $U(\lambda|a_1, \ldots, a_m|b_1, \ldots, b_m) = [u_{(j^1_1, \ldots, j^1_m)}| \ldots |u_{(j^M_1, \ldots, j^M_m)}]$. That is, the columns of each U-standard codeword are made from the set of "$2^{m-1}$" associated column vectors $\{u_{(j^1_1, \ldots, j^1_m)}, \ldots, u_{(j^M_1, \ldots, j^M_m)}\}$. For $\lambda = +1$, the columns of $U(\lambda|a_1, \ldots, a_m|b_1, \ldots, b_m)$ are those $u_{(j_1, \ldots, j_m)}$'s whose indexes, P, are zero. For $\lambda = -1$, the columns of $U(\lambda|a_1, \ldots, a_m|b_1, \ldots, b_m)$ are those $u_{(j_1, \ldots, j_m)}$'s whose indexes, P, are one. In the construction of each U-standard codeword, $U(\lambda|a_1, \ldots, a_m|b_1, \ldots, b_m)$, any right multiplication by a unitary matrix, V, provides an equivalent codeword for the same identifying vector. More precisely, different ones of the $U(\lambda|a_1, \ldots, a_m|b_1, \ldots, b_m)$ may be right multiplied by different unitary matrices and still produce equivalent codewords for the associated identifying vectors.

Each U-standard codeword is also related to a projection operator on $C^T$. In particular, each matrix $U(\lambda|a_1, \ldots, a_m|b_1, \ldots, b_m)$ defines a corresponding projection operator $P(\lambda|a_1, \ldots, a_m|b_1, \ldots, b_m)$ by:

$$P(\lambda|a_1, \ldots, a_m|b_1, \ldots, b_m) = U(\lambda|a_1, \ldots, a_m|b_1, \ldots, b_m)[U(\lambda|a_1, \ldots, a_m|b_1, \ldots, b_m)]^\dagger$$

where, "$\dagger$" designates a Hermitian conjugation. The projection operators have the form:

$$P(\lambda|a_1, \ldots, a_m|b_1, \ldots, b_m) = (1/2)[I + \lambda E(a_1, \ldots, a_m|b_1, \ldots, b_m)]$$

where I is the identity matrix and $E(a_1, \ldots a_m|b_1, \ldots, b_m) = e_1 \otimes \ldots \otimes e_m$. Here, each $e_j$ is a 2×2 matrix defined by the values of $a_j$ and $b_j$ in the "j"-th components of the identifying vector of the associated U-standard codeword. In particular, the $e_j$'s are defined as:

$$e_j = \begin{cases} I & \text{for } a_j = 0, b_j = 0 \\ \sigma^x & \text{for } a_j = 1, b_j = 0 \\ \sigma^y & \text{for } a_j = 1, b_j = 1 \\ \sigma^z & \text{for } a_j = 0, b_j = 1 \end{cases}.$$

Herein, I is the identity matrix, e.g., the 2×2 identity matrix in the case of the $e_j$'s, and $\sigma^x$, $\sigma^y$, and $\sigma^z$ are the 2×2 Pauli matrices, which are defined as follows:

$$\sigma^x = \begin{bmatrix} 0 & 1 \\ 1 & 0 \end{bmatrix}, \quad \sigma^y = \begin{bmatrix} 0 & i \\ -i & 0 \end{bmatrix}, \quad \sigma^z = \begin{bmatrix} 1 & 0 \\ 0 & -1 \end{bmatrix}.$$

From these definitions, it follows that the square of any $P(\lambda|a_1, \ldots, a_m|b_1, \ldots, b_m)$ is equal to itself and that each $P(\lambda|a_1, \ldots, a_m|b_1, \ldots, b_m)$ is Hermitian. Thus, each of the $P(\lambda|a_1, \ldots, a_m|b_1, \ldots, b_m)$'s is a projection operator. Each of the projection operators, $P(\lambda|a_1, \ldots, a_m|b_1, \ldots, b_m)$, is also different. Finally, for each of the identifiers, $(\lambda|a_1, \ldots, a_m$ $|b_1, \ldots, b_m)$, the corresponding codeword $U(\lambda|a_1, \ldots, a_m|b_1, \ldots, b_m)$ is a matrix whose columns are the eigenvectors having a particular eigenvalue, e.g., 1 or −1, for the projection operator that is associated to the same identifier, i.e., $P(\lambda|a_1, \ldots, a_m|b_1, \ldots, b_m)$. This provides a second definition of the code words of the U-standard codebook.

To construct a $U^O$-standard codebook, the codewords of one of the U-standard codebooks of same dimension are transformed by a selected transformation. The selected transformation may include one or both of the following operations: (A) left multiplication of all U-standard codewords by the same unitary matrix and (B) right multiplication of each of the U-standard codewords by arbitrary unitary matrices. In the operations of type (B), the unitary matrices that may be the same for all codewords or may differ arbitrarily from codeword to codeword.

3. Decoding MIMO Communications

Figure 3:
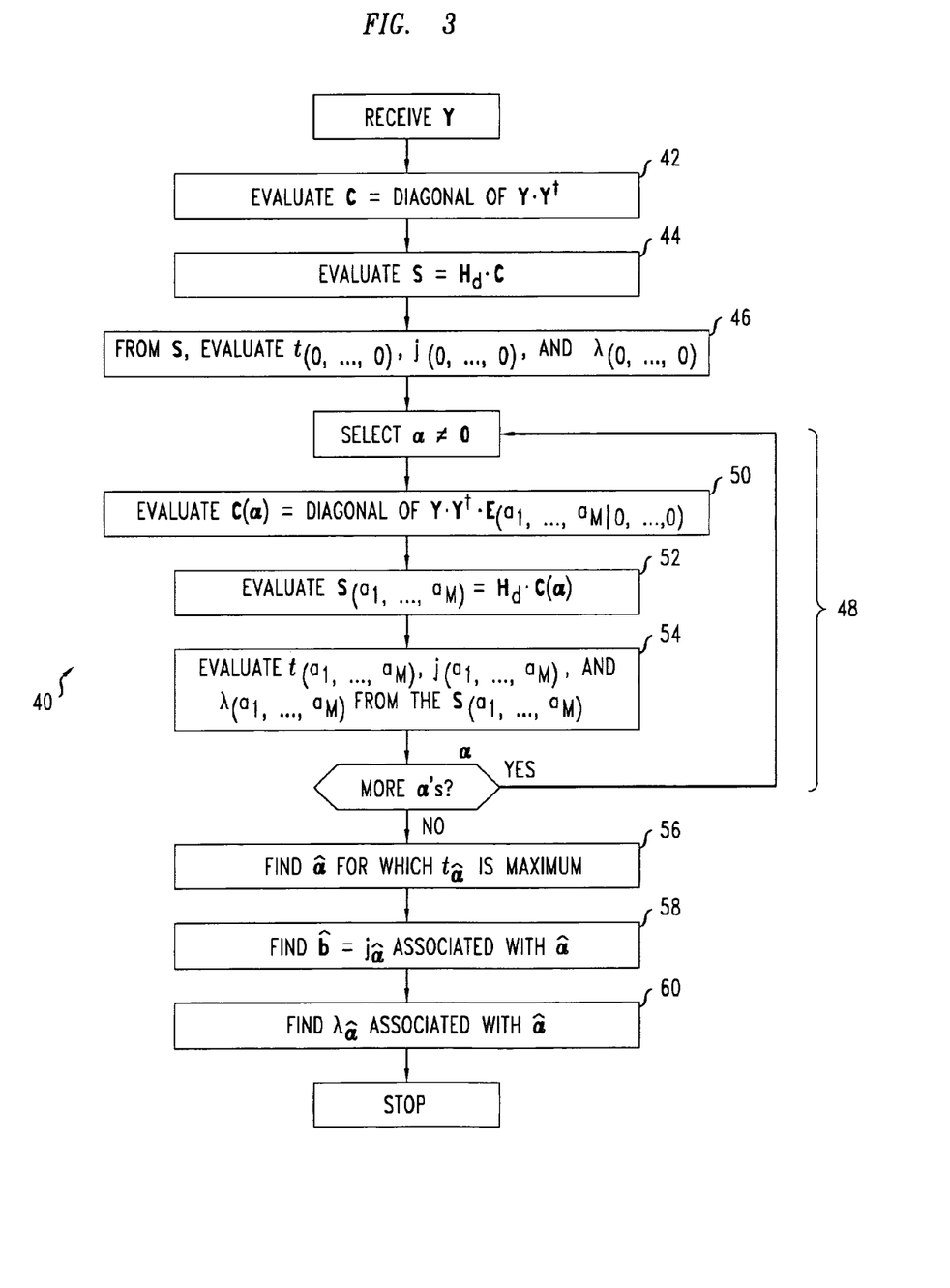
FIG. 3 is a flowchart illustrating a method of decoding MIMO communications that have been coded according to a $U^O$-standard codebook, e.g., as in the method of FIG. 2.

FIG. 3 illustrates a method 40 for decoding MIMO communications that were coded according to a $U^O$-standard codebook, e.g., as in step 28 of FIG. 2. The method 40 involves decoding the T×N matrix Y of complex signal amplitudes that is received by the reception antennae $18_1, 18_2, \ldots, 18_N$ over a set of T time slots assigned to one transmitted message, e.g., N may be equal to M. The decoding includes evaluating the inner product, $Tr[U^O_d \cdot U^{O\dagger}_d \cdot Y \cdot Y^\dagger]$, over the entire set of identifiers "d" in the $U^O$-standard codebook and identifying the transmitted codeword by determining which identifier "d" provides the largest value for the inner product. Since the decoding involves evaluating a number of traces of products of potentially large matrices, a naive approach to the decoding can require a large amount of processing time. The U-standard codebook has special features that the method 40 uses to enable a fast procedure for performing such a maximum likelihood determination of the transmitted codeword.

First, the method 40 includes evaluating a $2^m$-dimensional column vector, $C(0)$, where the "j"-th element of $C(0)$ is the "j"-th diagonal element of the matrix product $Y \cdot Y^\dagger$ (step 42). That is, the vector $C(0)$ is the diagonal portion of the matrix product $Y \cdot Y^\dagger$.

Second, the method 40 includes performing a fast Hadamard transform (FHT) of the vector $C(0)$ (step 44). The FHT provides a $2^m$-dimensional column vector $S(0)$, e.g., a real vector. The column vector $S(0)$ is defined by $S(0) = H_d \cdot C(0)$ where $H_d$ is the $2^m \times 2^m$ Hadamard matrix. The $2^m \times 2^m$ Hadamard matrix is defined by:

$$H_d = \begin{bmatrix} 1 & 1 \\ 1 & -1 \end{bmatrix} \otimes \ldots \otimes \begin{bmatrix} 1 & 1 \\ 1 & -1 \end{bmatrix}$$

where the direct product has m factors of $$\begin{bmatrix} 1 & 1 \\ 1 & -1 \end{bmatrix}.$$

Methods for performing FHTs are well known to those of skill in the art.

Third, the method 40 includes using the FHT to evaluate the quantities $t_{(0, \ldots, 0)}$, $j_{(0, \ldots, 0)}$, and $\lambda_{(0, \ldots, 0)}$ where the identifier $(0, \ldots, 0)$ is the m-dimension null vector (step 46).

The number, $t_{(0, \ldots, 0)}$, is the magnitude of the largest magnitude element of the vector $S(0, \ldots, 0)$ that is also not the first element. The number $j_{(0, \ldots, 0)}$ is the row index of the same largest magnitude element, and the number $\lambda_{(0, \ldots, 0)}$ is one if the sign of said same largest magnitude element is "+" and is minus one otherwise.

Fifth, the method 40 includes a loop execution (48) over all nonzero vectors $a = (a_1, \ldots, a_m)$, wherein the elements, e.g., $a_k$, of the vector a are selected from $\{0, 1\}$. Each loop execution includes evaluating $2^m$-dimensional column vector, $C(a)$, whose components are the diagonal components of $Y \cdot Y^\dagger \cdot E(a_1, \ldots, a_m|0, \ldots, 0)$ (step 50). In these evaluations, it is advantageous to use the fact that $E(a_1, \ldots, a_m|0, \ldots, 0)$ is a permutation matrix on $2^m$ objects to reduce the number of operations needed to obtain the diagonal components of $Y \cdot Y^\dagger \cdot E(a_1, \ldots, a_m|0, \ldots, 0)$. Next, each loop execution includes performing a FHT of $C(a)$ to determine a $2^m$-dimensional column vector $S(a_1, \ldots, a_m)$. That is, $S(a_1, \ldots, a_m) = H_d \cdot C(a)$ (step 52). Next, each loop execution includes evaluating the quantities $t(a_1, \ldots, a_m)$, $j(a_1, \ldots, a_m)$, and $\lambda(a_1, \ldots, a_m)$ (step 54). The number $t(a_1, \ldots, a_m)$ is the magnitude of the element of $S(a_1, \ldots, a_m)$ that has the largest magnitude. The integer number $j(a_1, \ldots, a_m)$ is the row index of the said largest magnitude element. Finally, the $\lambda(a_1, \ldots, a_m)$'s have values of +1 or −1. In particular, $\lambda(a_1, \ldots, a_m)$ is equal to one if said largest magnitude element is positive and is equal to minus one if the sign of said largest magnitude element is negative. The execution of the loop continues as long as nonzero vectors a exist, i.e., all values of the a-vector portion of the identifiers in the U-standard codebook.

Sixth, after terminating the loop execution (48), the method 40 returns an identifying vector $(\hat{\lambda}|\hat{a}|\hat{b})$ as the maximum likelihood determination of the identifier for the transmitted U-standard codeword. In particular, this determination involves finding the specific $(a_1, \ldots, a_m)$ for which $t(a_1, \ldots, a_m)$ is maximum (step 56). This specific $(a_1, \ldots, a_m)$ is the maximum likelihood estimate, $\hat{a}$, i.e., for the $(a_1, \ldots, a_m)$-portion of the identifier for the transmitted codeword. The determination includes finding the binary representation of the integer number $j_{\hat{a}}$ that is associated with the vector $\hat{a}$, i.e., one of the $j(a_1, \ldots, a_m)$'s of step 54 (step 58). This binary representation of $j_{\hat{a}}$ is the maximum likelihood estimate, $\hat{b}$, i.e., for the $(b_1, \ldots, b_m)$-portion of the identifier of the transmitted code word. Finally, the determination includes finding the value of the $\lambda_{\hat{a}}$ associated with the vector $\hat{a}$, i.e., one of the $\lambda(a_1, \ldots, a_m)$'s of step 54 (step 60). This value, i.e., +1 or −1, is the maximum likelihood estimate, $\hat{\lambda}$, for the $\lambda$-portion of the identifier of the transmitted code word.

Above method 40 uses special properties of U-standard codebooks to simplify the inner product, i.e., $Tr[U_d \cdot U_d^\dagger \cdot Y \cdot Y^\dagger]$, as described below.

For f-type identifying vectors, which have the form $(\lambda|0, \ldots, 0|b_1, \ldots, b_m)$, the decoding algorithm based on the above inner product requires evaluations as following:

$$\max\{Tr[P(\lambda|0,\ldots,0|b_1,\ldots,b_m) \cdot Y \cdot Y^\dagger]\} = $$
$$Tr[I \cdot Y \cdot Y^\dagger] + \max\{Tr[\lambda E_{(0,\ldots,0|b_1,\ldots,b_m)} \cdot Y \cdot Y^\dagger]\}.$$

Here, the projection operators, i.e., the $P(\lambda|a_1, \ldots, a_m|b_1, \ldots, b_m)$'s, and the $E_d$-type matrices, i.e., the $E(a_1, \ldots, a_m|b_1, \ldots, b_m)$'s, have already been defined. Also, max $\{ \ldots \}$ are maxima of the object between the braces over the shown set of identifiers. Since the first term on the right-hand-side of the above equation is constant, it can be dropped for the maximization operation. Thus, the maximization operation the over the subset of codewords that have f-type identifying vectors involves evaluating the maximum of $\{Tr[\lambda E(0, \ldots, 0|b_1, \ldots, b_m) \cdot Y \cdot Y^\dagger]\}$. But, the $E(0, \ldots, 0|b_1, \ldots, b_m)$'s are diagonal matrices, and their diagonal elements for the nonzero $(b_1, \ldots, b_m)$'s are the rows of the Hadamard matrix that follow the first row of the Hadamard matrix. For these reasons, $t_{(0, \ldots, 0)}$ and the binary form of $j_{(0, \ldots, 0)}$ from steps 42-46 are the respective maximum of $Tr[U_d \cdot U_d^\dagger \cdot Y \cdot Y^\dagger]$ and the $(b_1, \ldots, b_m)$-portion of the identifying vector for the codeword that maximizes the above trace over codewords with f-type identifying vectors.

For more general identifying vectors, the method 40 uses several other properties of the U-standard codebook to simplify the inner products needed in the procedure to identify the transmitted codeword according to the maximum likelihood algorithm. First, the maximum likelihood algorithm involves an evaluation over the set of codewords of the following expression:

$$\max\{Tr[P(\lambda | a_1, \ldots, a_m | b_1, \ldots, b_m) \cdot Y \cdot Y^\dagger]\} =$$
$$\max\{Tr[\lambda E_{(a_1, \ldots, a_m | b_1, \ldots, b_m)} \cdot Y \cdot Y^\dagger]\} =$$
$$\max\{Tr[\lambda E_{(a_1, \ldots, a_m | 0, \ldots, 0)} \cdot E_{(a_1, \ldots, a_m | b_1, \ldots, b_m)} \cdot Y \cdot Y^\dagger \cdot E_{(a_1, \ldots, a_m | 0, \ldots, 0)}]\} =$$
$$\max\{Tr[\lambda E_{(0, \ldots, 0 | b_1, \ldots, b_m)} \cdot Y \cdot Y^\dagger \cdot E_{(a_1, \ldots, a_m | 0, \ldots, 0)}]\}.$$

Here, the third expression follows from the cyclic property of the trace and the fact that the square of any $E_d$-type matrix is the identity matrix. The fourth expression follows from the identity:

$$E_{(a|b)} \cdot E_{(a'|b')} = E_{(a \oplus a' | b \oplus b')}$$

where the direct sums of indices therein are modulo-2 sums. With these simplifications, the trace, the product of $E(0, \ldots, 0|b_1, \ldots, b_m)$ times a right matrix is a FHT of the right matrix. Thus, the last expression explains the origin of the step 52 in the loop execution of the method 40.

Figure 4:
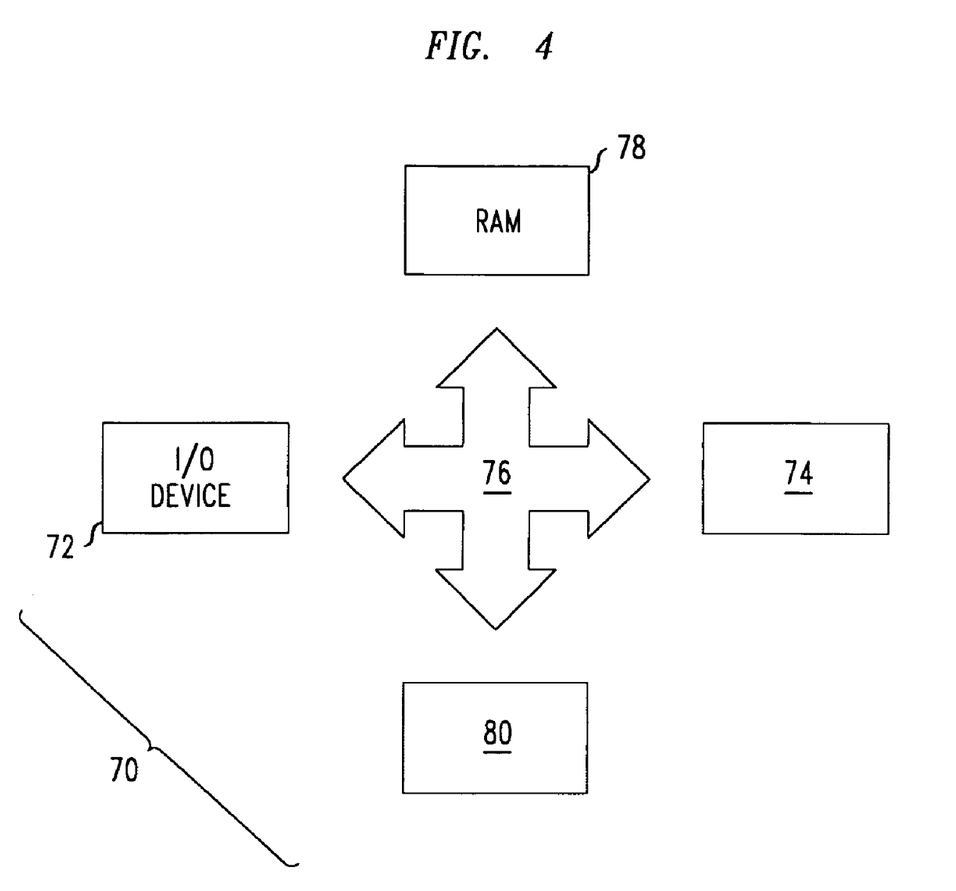
FIG. 4 is a block diagram for an apparatus configured to perform the decoding method of FIG. 3.

FIG. 4 shows an exemplary apparatus 70 for performing the decoding according to the method 40 of FIG. 3. The apparatus 70 includes an input/output device 72, a data storage device 74, a bus 76, a RAM memory 78, and a general processor 80. The input/output device 72 delivers the matrix Y signal amplitudes, which the antennas $18_1, \ldots, 18_N$ of FIG. 1 received from the channel 13, to the data storage device 74. The data storage device 74 stores data and a program of machine executable instructions. The machine executable instructions, e.g., encode the steps of the method 40 of FIG. 3. The bus 76 transports said instructions and/or data between the input/output device 72, the data storage device 74, the memory 78, and the processor 80. The processor 108 is capable of executing the program of machine executable instructions to manipulate and process the data in the data storage device 74 thereby perform the method 40 of decoding the received matrix Y to determine which codeword was transmitted.

In other embodiments, a field programmable gate array (FPGA), an application specific integrated circuit (ASIC), or a digital signal processor (DSP) may be configured to perform the decoding method 40 as shown in FIG. 3.

From the disclosure, drawings, and claims, other embodiments of the invention will be apparent to those skilled in the art.

What is claimed is:

1. An apparatus for transmitting a sequence of messages via a MIMO channel, comprising:

a MIMO transmitter having an array of antennas, being configured to select any codeword of a codebook, and being configured to select one of the codewords in response to receiving each message of the sequence, each codeword being a matrix; and wherein for each one of the selected codewords the transmitter is configured to transmit signals from the antennas in a series of time slots corresponding to the one of the selected codewords such that each antenna transmits one column of the one of the selected codewords and such that one row of the one of the selected codewords is transmitted in each of the time slots of the corresponding series; and wherein the transmitter is configured such that each of the codewords is a matrix $U(\lambda|a_1, \ldots, a_m|b_1, \ldots, b_m)$ and is configured such that the associated product $U(\lambda|a_1, \ldots, a_m|b_1, \ldots, b_m) \cdot U(\lambda|a_1, \ldots, a_m|b_1, \ldots, b_m)$ is a projection operator $P(\lambda|a_1, \ldots, a_m|b_1, \ldots, b_m)$ that is a unitary transformation of $\frac{1}{2}[I + \lambda E(a_1, \ldots, a_m|b_1, \ldots, b_m)]$, each $(a_1, \ldots, a_m|b_1, \ldots, b_m)$ being a nonzero vector whose components are zero or one, each $E(a_1, \ldots, a_m|b_1, \ldots, b_m)$ being a direct product of m $e_j$'s, each $e_j$ satisfying:

$$e_j = \begin{cases} I & \text{for } a_j = 0, b_j = 0 \\ \sigma^x & \text{for } a_j = 1, b_j = 0 \\ \sigma^y & \text{for } a_j = 1, b_j = 1 \\ \sigma^z & \text{for } a_j = 0, b_j = 1 \end{cases}.$$

2. The apparatus of claim 1, wherein the $\lambda$'s are selected from one and minus one.

3. The apparatus of claim 2, wherein the transmitter is such that each codeword of the codebook is a $T \times 2^{m-1}$ matrix, the array having $2^{m-1}$ of the transmission antennas.

4. The apparatus of claim 3, and wherein T is equal to $2^m$.

5. A method of transmitting a sequence of messages from a MIMO array of antennas, comprising:

for each message of the sequence of messages, selecting a codeword from a preselected codebook, each codeword of the codebook being a matrix;

for each one of the selected codewords, transmitting signals from the MIMO array of antennas in a series of time slots corresponding to the one of the selected codewords such that the MIMO array transmits one column of the one of the selected codewords from each antenna and such that one row of the one of the selected codewords is transmitted in each of the time slots of the corresponding series; and wherein each of the codewords of the codebook is equal to a matrix $U(\lambda|a_1, \ldots, a_m|b_1, \ldots, b_m)$ left multiplied by a unitary matrix and right multiplied by a unitary matrix, the columns of the $U(\lambda|a_1, \ldots, a_m|b_1, \ldots, b_m)$'s being given by $u_{j_1} \otimes \ldots \otimes u_{j_m}$'s, wherein each $u_{j_k}$ satisfies $$u_{j_k} = \begin{cases} v_{j_k}^I & \text{for } a_k = 0, b_k = 0 \\ v_{j_k}^x & \text{for } a_k = 1, b_k = 0 \\ v_{j_k}^y & \text{for } a_k = 1, b_k = 1 \\ v_{j_k}^z & \text{for } a_k = 0, b_k = 1 \end{cases}$$

and wherein $$v_0^I = \begin{bmatrix} 1 \\ 0 \end{bmatrix}, \quad v_1^I = \begin{bmatrix} 0 \\ 1 \end{bmatrix}, \quad v_0^x = \begin{bmatrix} 1 \\ 1 \end{bmatrix}, \quad v_1^x = \begin{bmatrix} 1 \\ -1 \end{bmatrix},$$

$$v_0^y = \begin{bmatrix} 1 \\ -i \end{bmatrix}, \quad v_1^y = \begin{bmatrix} 1 \\ i \end{bmatrix}, \quad v_0^z = \begin{bmatrix} 1 \\ 0 \end{bmatrix}, \quad v_1^z = \begin{bmatrix} 0 \\ 1 \end{bmatrix}.$$

6. The method of claim 5, wherein each product $U(\lambda | a_1, \ldots, a_m | b_1, \ldots, b_m) \cdot U(\lambda | a_1, \ldots, a_m | b_1, \ldots, b_m)$ is a projection operator $P(\lambda | a_1, \ldots, a_m | b_1, \ldots, b_m)$ given by $\frac{1}{2}[I + \lambda E(a_1, \ldots, a_m | b_1, \ldots, b_m)]$ for a nonzero vector $(a_1, \ldots, a_m | b_1, \ldots, b_m)$ whose elements belong to the set $\{1, 0\}$, the $E(a_1, \ldots, a_m | b_1, \ldots, b_m)$'s being $e_1 \otimes \ldots \otimes e_m$'s, wherein each $e_j$ of the $e_1 \otimes \ldots \otimes e_m$'s satisfies:

$$e_j = \begin{cases} I & \text{for } a_j = 0, b_j = 0 \\ \sigma^x & \text{for } a_j = 1, b_j = 0 \\ \sigma^y & \text{for } a_j = 1, b_j = 1 \\ \sigma^z & \text{for } a_j = 0, b_j = 1 \end{cases}.$$

7. The method of claim 5, wherein each codeword is a $T \times 2^{m-1}$ matrix, the array having $2^{m-1}$ or less of the antennas and wherein the number T is equal to $2^m$.

8. The method of claim 6, further comprising:
for each particular one of the selected codewords, receiving the transmitted signals in reception antennas of a receiving MIMO array in each time slot of the series corresponding to the particular one of the selected codewords, the signals received in each time slot of the series corresponding to the particular one of the selected codewords forming a row of a received signal matrix Y; and
evaluating a maximum of $Tr[P(\lambda|a_1, \ldots, a_m|b_1, \ldots, b_m) \cdot Y \cdot Y^\dagger]$ over codeword identifying vectors $(\lambda|a_1, \ldots, a_m|b_1, \ldots, b_m)$ of the codebook to identify the particular one of the selected codewords.

9. A method of receiving information, comprising:
in each of a sequence of time slots, receiving a vector of signal values for a transmitted codeword in antennas of a MIMO receiver array, each vector forming one row of a matrix Y, each antenna receiving the signal values of one column of the matrix Y over the sequence of time slots such that one of the antennas receives the signal values of each column of the matrix Y; and
for a zero in-component vector $(0, \ldots, 0)$, evaluating an associated vector $S(0, \ldots, 0)$, the vector $S(0, \ldots, 0)$ being given by a Hadamard transform of the diagonal part of the square matrix $Y \cdot Y^\dagger$.

10. The method of claim 9, further comprising:
for a plurality of nonzero in-component vectors $(a_1, \ldots, a_m)$ whose components belong to $\{0, 1\}$, evaluating an associated vector $S(a)$, each vector $S(a)$ being given by a Hadamard transform of a diagonal part of a square matrix given by $Y \cdot Y^\dagger \cdot E(a_1, \ldots, a_m|0, \ldots, 0)$, the $E(a_1, \ldots, a_m|0, \ldots, 0)$'s being $e_1 \otimes \ldots \otimes e_m$'s, wherein each $e_j$ of the $e_1 \otimes \ldots \otimes e_m$'s is the identity I for $a_j = 0$ and is $\sigma^x$ for $a_j = 1$.

11. The method of claim 10, wherein the steps of evaluating Hadamard transforms of the diagonal parts of the $Y \cdot Y^\dagger \cdot E(a_1, \ldots, a_m|0, \ldots, 0)$'s are performed for each nonzero vector $(a_1, \ldots, a_m)$, the elements of $(a_1, \ldots, a_m)$ belonging to $\{0, 1\}$.

12. The method of claim 10, further comprising:
identifying a particular one of the Hadamard transforms that has a component whose magnitude is of equal or larger magnitude than the components of the others of the Hadamard transforms.

13. The method of claim 12, further comprising:
evaluating an index of a largest magnitude component in the particular one of the Hadamard transforms.

14. The method of claim 13, further comprising:
determining an identity of the transmitted codeword based on the evaluated index and the vector $(a_1, \ldots, a_m)$ associated to the particular one of the Hadamard transforms.

15. The method of claim 11, further comprising:
identifying a particular zero or nonzero vector $(a_1, \ldots, a_m)$ whose associated one of the Hadamard transforms has a component whose magnitude is of equal or larger magnitude than the components of the other Hadamard transforms; and
identifying an index of a largest magnitude component in the one of the Hadamard transforms.

16. An apparatus, comprising:
a MIMO receiver including an array of antennas, the receiver being configured to receive a vector of signal values for a transmitted codeword via the antennas in each of a sequence of time slots, each vector forming one row of a matrix Y, the receiver being such that each antenna receives the signal values of one column of the matrix Y over the sequence of time slots such that the signal values of each column of the matrix Y are received in one of the antennas of the array; and
wherein the receiver is configured to evaluate a vector $S(0, \ldots, 0)$ for a zero m-component vector $(0, \ldots, 0)$ from the received signal values, the vector $S(0, \ldots, 0)$ being given by a Hadamard transform of the diagonal part of the square matrix $Y \cdot Y^\dagger$.

17. The apparatus of claim 16, wherein the receiver is configured to evaluate a vector $S(a)$ for a plurality of nonzero in-component vectors $(a_1, \ldots, a_m)$ whose components belong to the set $\{0, 1\}$, each vector $S(a)$ being a Hadamard transform of the diagonal part of a square matrix $Y \cdot Y^\dagger \cdot E(a_1, \ldots, a_m|0, \ldots, 0)$, the $E(a_1, \ldots, a_m|0, \ldots, 0)$'s being given by $e_1 \otimes \ldots \otimes e_m$'s, each $e_j$ of the $e_1 \otimes \ldots \otimes e_m$'s being the 2×2 identity matrix I for $a_j = 0$ and being the Pauli matrix $\sigma^x$ for $a_j = 1$.

18. The apparatus of claim 17, wherein the receiver is configured to evaluate the Hadamard transforms of the diagonals of the square matrices given by $Y \cdot Y^\dagger \cdot E(a_1, \ldots, a_m|0, \ldots, 0)$ for each nonzero vector $(a_1, \ldots, a_m)$, the elements of the vectors $(a_1, \ldots, a_m)$ belonging to the set $\{0, 1\}$.

19. The apparatus of claim 17, wherein the receiver is further configured to identify a particular one of that Hadamard transforms that has a component whose magnitude is of equal or larger magnitude that the components of the others of the Hadamard transforms.

20. The apparatus of claim 19, wherein the receiver is further configured to evaluate an index of a largest magnitude component in the particular one of the Hadamard transforms and determine an identity of the transmitted codeword based on the evaluated index and the vector $(a_1, \ldots, a_m)$ associated to the particular one of the Hadamard transforms.

* * * * *

UNITED STATES PATENT AND TRADEMARK OFFICE
CERTIFICATE OF CORRECTION

PATENT NO. : 7,599,444 B2  Page 1 of 1
APPLICATION NO. : 11/317140
DATED : October 6, 2009
INVENTOR(S) : Alexei Ashikhmin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this

Twenty-eighth Day of September, 2010

David J. Kappos
*Director of the United States Patent and Trademark Office*